United States Patent
Xu

(10) Patent No.: US 9,535,275 B2
(45) Date of Patent: Jan. 3, 2017

(54) ARRAY SUBSTRATE DRIVING CIRCUIT, ARRAY SUBSTRATE, AND CORRESPONDING LIQUID CRYSTAL DISPLAY

(71) Applicant: Shenzhen China Star Optoelectronics Technology Co., Ltd., Shenzhen, Guangdong (CN)

(72) Inventor: Xiangyang Xu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 503 days.

(21) Appl. No.: 14/235,120

(22) PCT Filed: Jan. 8, 2014

(86) PCT No.: PCT/CN2014/070315
§ 371 (c)(1),
(2) Date: Jan. 27, 2014

(87) PCT Pub. No.: WO2015/096206
PCT Pub. Date: Jul. 2, 2015

(65) Prior Publication Data
US 2015/0185520 A1    Jul. 2, 2015

(30) Foreign Application Priority Data

Dec. 27, 2013  (CN) .......................... 2013 1 0734794

(51) Int. Cl.
*G09G 3/36* (2006.01)
*G02F 1/1343* (2006.01)
(Continued)

(52) U.S. Cl.
CPC ......... *G02F 1/13306* (2013.01); *G02F 1/1368* (2013.01); *G02F 1/133514* (2013.01);
(Continued)

(58) Field of Classification Search
CPC .............. G09G 2310/0286; G09G 2300/0426; G09G 2300/0408; G09G 2310/0267; G09G 2310/021; G09G 3/3655
See application file for complete search history.

(56) References Cited

U.S. PATENT DOCUMENTS 7,196,683 B2 *  3/2007  Yamamoto ........... G09G 3/3648
                                                           345/204
7,468,720 B2 * 12/2008  Kim ..................... G09G 3/3614
                                                           345/100
(Continued)

*Primary Examiner* — William Boddie
*Assistant Examiner* — Alecia D English
(74) *Attorney, Agent, or Firm* — Andrew C. Cheng

(57) ABSTRACT

The present invention provides an array substrate driving circuit, including a plurality of GoA driving units used to drive a plurality of gate lines, and a plurality of Com driving units used to drive a plurality of common electrode lines, wherein each GoA driving unit is interconnected to one gate line, and each Com driving unit is interconnected to one common electrode line. Wherein the plurality of the GoA driving units are disposed on one side of the array substrate, and the Com driving units are disposed on the other side of the array substrate. Wherein gate line driving signals on the gate lines and Com driving signals on the adjacent common electrode lines are synchronized from each other but with opposite polarity. The present invention further provides an array substrate and liquid crystal display. By implementation of the present invention, the negative effect to the displaying quality caused by the feed-through voltage can be avoided, and the displaying image can be upgraded.

12 Claims, 8 Drawing Sheets

(51) Int. Cl.
*G02F 1/133* (2006.01)
*G02F 1/1335* (2006.01)
*G02F 1/1362* (2006.01)
*G02F 1/1368* (2006.01)

(52) U.S. Cl.
CPC .. *G02F 1/136213* (2013.01); *G02F 1/136286* (2013.01); *G09G 3/3648* (2013.01); *G09G 3/3655* (2013.01); *G09G 3/3677* (2013.01); *G09G 2300/08* (2013.01); *G09G 2320/0219* (2013.01)

(56) References Cited

U.S. PATENT DOCUMENTS

| | | | | |
|---|---|---|---|---|
| 8,289,255 B2* | 10/2012 | Chen | ............ | G09G 3/20 345/100 |
| 8,872,749 B2* | 10/2014 | Shigaki | ............ | G09G 3/3674 345/100 |
| 2014/0176410 A1* | 6/2014 | Ma | ............ | G09G 3/3622 345/92 |

* cited by examiner

ARRAY SUBSTRATE DRIVING CIRCUIT, ARRAY SUBSTRATE, AND CORRESPONDING LIQUID CRYSTAL DISPLAY

CROSS REFERENCE

This application is claiming a priority arisen from a patent application, entitled with "Array Substrate Driving Circuit, Array Substrate, And Corresponding Liquid Crystal Display", submitted to China Patent Office on Dec. 27, 2013, designated with an Application Number 201310734794.X. The whole and complete disclosure of such patent application is hereby incorporated by reference. This application also related to National Stage application Ser. No. 14/235,129, submitted on the same date, entitled, "Array Substrate Driving Circuit, Array Substrate, And Corresponding Liquid Crystal Display" assigned to the same assignee.

FIELD OF THE INVENTION

The present invention relates to the technical field of thin film transistor liquid crystal display, and more particularly, to an array substrate driving circuit, array substrate, and corresponding liquid crystal display.

DESCRIPTION OF PRIOR ART

In the existing prior art, thin film transistor (TFT) has been used to configure the gate driver on array (GoA) circuit. Secondary driving method is a common driving method in GoA circuit. As shown in FIGS. 1 and 2, an illustration of a prior art cascade circuit of the one-side GoA driving unit is shown. In the existing cascade circuit, firstly, the clock signals to different GoA driving units are supplied from two separate Clk_A and Clk_B, respectively, and then driving signals to the gate drivers of the TFT array substrate will be supplied by GoA driving units arranged in column. Under this secondary driving method, there are two different values of the output voltage of the gate line driving signals: open voltage, and closed voltage. Variation of the voltage of the gate line driving signal will generate the feed-through voltage. The cause of the feed-through voltage is mainly because there are other voltage variations on the display panel. Then, through the parasite capacitance or storage capacitance, the accuracy of the displaying voltage will be affected. There are three sources of voltage variations on the liquid crystal display panel: voltage variation of gate line driving signal, voltage variation of source electrode driving signal, and voltage variation of the common electrode signal. Among those three, both the voltage variations of the gate line driving signal and the common electrode signal will bring up the largest impact. If the voltage of the common electrode is remained as constant, then the cause of the feed-through voltage is limited to the voltage variation of the gate line driving signal.

FIG. 3 is a voltage waveform diagram of a Cs on common formed by common electrode gate lines, in which the voltage of the common electrode is remained unchanged. A feed-through voltage passing Cgd equals to $$Cgd \text{ feedthrough voltage} = (Vg\_high - Vg\_low) * Cgd / (Cgd + Clc + Cs);$$

Wherein Vg_high and Vg_low are open and closed voltage of gate driving line; and Cgd, Clc and Cs are the parasite capacitance, liquid crystal capacitance, and storage capacitance of the TFT. Because the feed-through voltage is mainly a variation of the voltage of the gate electrode when the TFT is closed, and it will pull down the pixel voltage through the parasite voltage Cgd. No matter the positive or negative of the pixel electrode, the feed-through voltage will impose a negative pull down to the pixel voltage. Accordingly, compensation to the voltage of common electrode can reduce the impact of the feed-through voltage. However, because Clc is not a constant parameter, accordingly, improving the image quality by adjusting the voltage of the common electrode can not be readily achieved.

SUMMARY OF THE INVENTION

It is an object of the present invention to provide an array substrate driving circuit, array substrate, and corresponding liquid crystal display so as to resolve the technical issues encountered by the prior art. Specially, the negative effect to the displaying quality caused by the feed-through voltage can be avoided, and the manufacturing cost of the liquid crystal display panel is reduced as well.

In order to resolve the technical issues encountered by the prior art, the present invention provides an array substrate driving circuit, including a plurality of GoA driving units used to drive a plurality of gate lines, and a plurality of Com driving units used to drive a plurality of common electrode lines, wherein each GoA driving unit is interconnected to one gate line, and each Com driving unit is interconnected to one common electrode line;

wherein the plurality of the GoA driving units are disposed on one side of the array substrate, and the Com driving units are disposed on the other side of the array substrate;

each of the GoA driving units being associated with a first driving signal input end, a second driving signal input end and a signal output end, wherein the first driving signal input end is interconnected with the signal output end of an upstream GoA driving unit, and the second driving signal input end is interconnected with the signal output end of a downstream GoA driving unit, wherein the gate lines interconnected with the gate lines of the GoA driving units are interconnected to the signal output ends;

each of the Com driving units being associated with a first driving signal input end, a second driving signal input end and a signal output end, wherein the first driving signal input end of the Com driving unit is interconnected with the signal output end of an upstream GoA driving unit, and the second driving signal input end of the Com driving unit is interconnected with the signal output end of a downstream GoA driving unit, wherein the common electrode lines interconnected to the Com driving units are interconnected to the signal output ends of the Com driving units; and wherein gate line driving signals on the gate lines and Com driving signals on the adjacent common electrode lines are synchronized from each other but with opposite polarity.

Wherein each of the GoA driving units includes a first thin film transistor, a second thin film transistor, a third thin film transistor, a fourth thin film transistor, a fifth thin film transistor, and a storage capacitance, wherein source and gate electrodes of the first thin film transistor are interconnected to the signal output end of the upstream GoA driving unit, and drain electrode of the first thin film transistor is interconnected to a gate electrode of the second thin film transistor, a first end of a storage capacitance, and further connected to a drain electrode of the third thin firm transistor, respectively;

a gate electrode of the fifth thin film transistor is interconnected with an output end of a clock, and a source electrode is interconnected to a high potential input line input line;

a source electrode of the second thin film transistor is interconnected with a drain electrode of the fifth thin film transistor, a gate electrode of the second thin film transistor is interconnected to the first end of the storage capacitance, a drain electrode and an signal output end of the second thin film transistor are interconnected together, and further interconnected to a source gate of the fourth thin film transistor, and a second end of the storage capacitance;

a source electrode of the third thin film transistor is interconnected to the first end of the storage capacitance, and a gate electrode of the third thin film transistor is interconnected to a signal output end of a downstream GoA driving unit, and a source electrode is interconnected to a low potential line or ground; and a source electrode and a signal output end of the fourth thin film transistor are interconnected to the second end of the storage capacitance, a gate electrode of the fourth thin film transistor is interconnected to the signal output end of a downstream GoA driving unit, and a drain electrode of the fourth thin film transistor is interconnected to a low potential line or ground.

Wherein each of the Com driving units includes a first thin film transistor, a second thin film transistor, a third thin film transistor, a fourth thin film transistor, a fifth thin film transistor, and a storage capacitance, wherein a source electrode and a gate electrode of the first thin film transistor are interconnected with a signal output end of a upstream GoA driving unit, a drain electrode of the first thin film transistor is interconnected to a gate electrode of the second thin film transistor, the first end of the storage capacitance, and a drain electrode of the third thin film transistor, respectively;

a gate of the fifth thin film transistor is interconnected with an output end of a clock, and a source electrode of the fifth thin film transistor is interconnected to a signal input end of a first standard common electrode;

a source electrode of the second thin film transistor is interconnected to a drain electrode of the fifth thin film transistor, a gate electrode of the second thin film transistor is interconnected to the first end of the storage capacitance, and a drain electrode of and a signal output end of the second thin film transistor are interconnected together, and further interconnected to a drain electrode of the fourth thin film transistor, and the second end of the storage capacitance;

a source electrode of the third thin film transistor is interconnected to the first end of the storage capacitance, and a drain electrode of the third thin film transistor is interconnected to a signal output end of a downstream GoA, and a drain electrode of the third thin film transistor is interconnected to a signal line of a second standard common electrode; and a source electrode and a signal output end of the fourth thin film transistor are interconnected to the second end of the storage capacitance, a gate electrode of the fourth thin film transistor is interconnected to a signal output end of a downstream GoA driving unit, and a drain electrode of the fourth thin film transistor is interconnected to the second standard common electrode.

Wherein a clock signal output end connected to each of the GoA driving units connected by odd row of the gate lines is referred to a first clock signal output end, and wherein a clock signal output end connected to each of the GoA driving units connected by even row of the gate lines is referred to a first clock signal output end;

wherein a clock signal output end connected to each of the Com driving units connected by odd row of the common electrode lines is referred to a first clock signal output end, and wherein a clock signal output end connected to each of the Com driving units connected by even row of the common electrode lines is referred to a first clock signal output end; and wherein the first and second clock signals have the same cyclic period, but with half cycle difference in polarity.

Wherein first driving signal input ends of the GoA driving units and the Com driving units located at the upfront is each interconnected with a scanning triggering signal line so as to trigger operation of the GoA driving unit and the Com driving unit located at the upfront.

Correspondingly, the present invention further provides an array substrate for liquid crystal display, includes a plurality of pixels defined by gate lines and data lines, and each of the pixels is configured with thin film transistor and pixel electrode; further including a plurality of GoA driving units used to drive a plurality of gate lines, and a plurality of Com driving units used to drive a plurality of common electrode lines, wherein each GoA driving unit is interconnected to one gate line, and each Com driving unit is interconnected to one common electrode line;

wherein the plurality of the GoA driving units are disposed on one side of the array substrate, and the Com driving units are disposed on the other side of the array substrate;

each of the GoA driving units being associated with a first driving signal input end, a second driving signal input end and a signal output end, wherein the first driving signal input end is interconnected with the signal output end of an upstream GoA driving unit, and the second driving signal input end is interconnected with the signal output end of a downstream GoA driving unit, wherein the gate lines interconnected with the gate lines of the GoA driving units are interconnected to the signal output ends;

each of the Com driving units being associated with a first driving signal input end, a second driving signal input end and a signal output end, wherein the first driving signal input end of the Com driving unit is interconnected with the signal output end of an upstream GoA driving unit, and the second driving signal input end of the Com driving unit is interconnected with the signal output end of a downstream GoA driving unit, wherein the common electrode lines interconnected to the Com driving units are interconnected to the signal output ends of the Com driving units; and wherein gate line driving signals on the gate lines and Com driving signals on the adjacent common electrode lines are synchronized from each other but with opposite polarity.

Wherein each of the GoA driving units includes a first thin film transistor, a second thin film transistor, a third thin film transistor, a fourth thin film transistor, a fifth thin film transistor, and a storage capacitance, wherein source and gate electrodes of the first thin film transistor are interconnected to the signal output end of the upstream GoA driving unit, and drain electrode of the first thin film transistor is interconnected to a gate electrode of the second thin film transistor, a first end of a storage capacitance, and further connected to a drain electrode of the third thin firm transistor, respectively;

a gate electrode of the fifth thin film transistor is interconnected with an output end of a clock, and a source electrode is interconnected to a high potential input line input line;

a source electrode of the second thin film transistor is interconnected with a drain electrode of the fifth thin film transistor, a gate electrode of the second thin film transistor is interconnected to the first end of the storage capacitance, a drain electrode and an signal output end of the second thin film transistor are interconnected together, and further interconnected to a source gate of the fourth thin film transistor, and a second end of the storage capacitance;

a source electrode of the third thin film transistor is interconnected to the first end of the storage capacitance, and a gate electrode of the third thin film transistor is interconnected to a signal output end of a downstream GoA driving unit, and a source electrode is interconnected to a low potential line or ground; and a source electrode and a signal output end of the fourth thin film transistor are interconnected to the second end of the storage capacitance, a gate electrode of the fourth thin film transistor is interconnected to the signal output end of a downstream GoA driving unit, and a drain electrode of the fourth thin film transistor is interconnected to a low potential line or ground.

Wherein each of the Com driving units includes a first thin film transistor, a second thin film transistor, a third thin film transistor, a fourth thin film transistor, a fifth thin film transistor, and a storage capacitance, wherein a source electrode and a gate electrode of the first thin film transistor are interconnected with a signal output end of a upstream GoA driving unit, a drain electrode of the first thin film transistor is interconnected to a gate electrode of the second thin film transistor, the first end of the storage capacitance, and a drain electrode of the third thin film transistor, respectively;

a gate of the fifth thin film transistor is interconnected with an output end of a clock, and a source electrode of the fifth thin film transistor is interconnected to a signal input end of a first standard common electrode;

a source electrode of the second thin film transistor is interconnected to a drain electrode of the fifth thin film transistor, a gate electrode of the second thin film transistor is interconnected to the first end of the storage capacitance, and a drain electrode of and a signal output end of the second thin film transistor are interconnected together, and further interconnected to a drain electrode of the fourth thin film transistor, and the second end of the storage capacitance;

a source electrode of the third thin film transistor is interconnected to the first end of the storage capacitance, and a drain electrode of the third thin film transistor is interconnected to a signal output end of a downstream GoA, and a drain electrode of the third thin film transistor is interconnected to a signal line of a second standard common electrode; and a source electrode and a signal output end of the fourth thin film transistor are interconnected to the second end of the storage capacitance, a gate electrode of the fourth thin film transistor is interconnected to a signal output end of a downstream GoA driving unit, and a drain electrode of the fourth thin film transistor is interconnected to the second standard common electrode.

Wherein a clock signal output end connected to each of the GoA driving units connected by odd row of the gate lines is referred to a first clock signal output end, and wherein a clock signal output end connected to each of the GoA driving units connected by even row of the gate lines is referred to a first clock signal output end;

wherein a clock signal output end connected to each of the Com driving units connected by odd row of the common electrode lines is referred to a first clock signal output end, and wherein a clock signal output end connected to each of the Com driving units connected by even row of the common electrode lines is referred to a first clock signal output end; and wherein the first and second clock signals have the same cyclic period, but with half cycle difference in polarity.

Wherein first driving signal input ends of the GoA driving units and the Com driving units located at the upfront is each interconnected with a scanning triggering signal line so as to trigger operation of the GoA driving unit and the Com driving unit located at the upfront.

Correspondingly, according to another aspect of the present invention, a liquid crystal display is provided and it includes an array substrate;

a colorful filter substrate arranged opposite to the array substrate; and a liquid crystal layer arranged between the array substrate and the colorful filter substrate;

wherein the array substrate includes a plurality of pixels defined by gate lines and data lines, and each of the pixels is configured with thin film transistor and pixel electrode; further including a plurality of GoA driving units used to drive a plurality of gate lines, and a plurality of Com driving units used to drive a plurality of common electrode lines, wherein each GoA driving unit is interconnected to one gate line, and each Com driving unit is interconnected to one common electrode line;

wherein the plurality of the GoA driving units are disposed on one side of the array substrate, and the Com driving units are disposed on the other side of the array substrate;

each of the GoA driving units being associated with a first driving signal input end, a second driving signal input end and a signal output end, wherein the first driving signal input end is interconnected with the signal output end of an upstream GoA driving unit, and the second driving signal input end is interconnected with the signal output end of a downstream GoA driving unit, wherein the gate lines interconnected with the gate lines of the GoA driving units are interconnected to the signal output ends;

each of the Com driving units being associated with a first driving signal input end, a second driving signal input end and a signal output end, wherein the first driving signal input end of the Com driving unit is interconnected with the signal output end of an upstream GoA driving unit, and the second driving signal input end of the Com driving unit is interconnected with the signal output end of a downstream GoA driving unit, wherein the common electrode lines interconnected to the Com driving units are interconnected to the signal output ends of the Com driving units; and wherein gate line driving signals on the gate lines and Com driving signals on the adjacent common electrode lines are synchronized from each other but with opposite polarity.

Wherein each of the GoA driving units includes a first thin film transistor, a second thin film transistor, a third thin film transistor, a fourth thin film transistor, a fifth thin film transistor, and a storage capacitance, wherein source and gate electrodes of the first thin film transistor are interconnected to the signal output end of the upstream GoA driving unit, and drain electrode of the first thin film transistor is interconnected to a gate electrode of the second thin film transistor, a first end of a storage capacitance, and further connected to a drain electrode of the third thin firm transistor, respectively;

a gate electrode of the fifth thin film transistor is interconnected with an output end of a clock, and a source electrode is interconnected to a high potential input line input line;

a source electrode of the second thin film transistor is interconnected with a drain electrode of the fifth thin film transistor, a gate electrode of the second thin film transistor is interconnected to the first end of the storage capacitance, a drain electrode and an signal output end of the second thin film transistor are interconnected together, and further interconnected to a source gate of the fourth thin film transistor, and a second end of the storage capacitance;

a source electrode of the third thin film transistor is interconnected to the first end of the storage capacitance, and a gate electrode of the third thin film transistor is interconnected to a signal output end of a downstream GoA driving unit, and a source electrode is interconnected to a low potential line or ground; and a source electrode and a signal output end of the fourth thin film transistor are interconnected to the second end of the storage capacitance, a gate electrode of the fourth thin film transistor is interconnected to the signal output end of a downstream GoA driving unit, and a drain electrode of the fourth thin film transistor is interconnected to a low potential line or ground.

Wherein each of the Com driving units includes a first thin film transistor, a second thin film transistor, a third thin film transistor, a fourth thin film transistor, a fifth thin film transistor, and a storage capacitance, wherein a source electrode and a gate electrode of the first thin film transistor are interconnected with a signal output end of a upstream GoA driving unit, a drain electrode of the first thin film transistor is interconnected to a gate electrode of the second thin film transistor, the first end of the storage capacitance, and a drain electrode of the third thin film transistor, respectively;

a gate of the fifth thin film transistor is interconnected with an output end of a clock, and a source electrode of the fifth thin film transistor is interconnected to a signal input end of a first standard common electrode;

a source electrode of the second thin film transistor is interconnected to a drain electrode of the fifth thin film transistor, a gate electrode of the second thin film transistor is interconnected to the first end of the storage capacitance, and a drain electrode of and a signal output end of the second thin film transistor are interconnected together, and further interconnected to a drain electrode of the fourth thin film transistor, and the second end of the storage capacitance;

a source electrode of the third thin film transistor is interconnected to the first end of the storage capacitance, and a drain electrode of the third thin film transistor is interconnected to a signal output end of a downstream GoA, and a drain electrode of the third thin film transistor is interconnected to a signal line of a second standard common electrode; and a source electrode and a signal output end of the fourth thin film transistor are interconnected to the second end of the storage capacitance, a gate electrode of the fourth thin film transistor is interconnected to a signal output end of a downstream GoA driving unit, and a drain electrode of the fourth thin film transistor is interconnected to the second standard common electrode.

Wherein a clock signal output end connected to each of the GoA driving units connected by odd row of the gate lines is referred to a first clock signal output end, and wherein a clock signal output end connected to each of the GoA driving units connected by even row of the gate lines is referred to a first clock signal output end;

wherein a clock signal output end connected to each of the Com driving units connected by odd row of the common electrode lines is referred to a first clock signal output end, and wherein a clock signal output end connected to each of the Com driving units connected by even row of the common electrode lines is referred to a first clock signal output end; and wherein the first and second clock signals have the same cyclic period, but with half cycle difference in polarity.

Wherein first driving signal input ends of the GoA driving units and the Com driving units located at the upfront is each interconnected with a scanning triggering signal line so as to trigger operation of the GoA driving unit and the Com driving unit located at the upfront.

The present invention can be concluded with the following advantages when the embodiments are implemented.

In the embodiments made in accordance with the present invention, by using bi-lateral driving units, i.e. the GoA driving unit and Com driving unit, the Com driving signal generated by the Com driving unit can be synchronized with the gate line driving signal. In addition, they polarities are opposite from each other. By this arrangement, the negative pulling effect of the pixel voltage resulted from the gate line driving signal can be readily offset. As a result, the negative effect to the displaying quality caused by the feed-through voltage can be avoided, and the displaying image can be upgraded. On the other hand, by the asymmetric arrangement of the bilateral driving units, this is really beneficial to make the narrow-boarder display panel, and the manufacturing cost of the liquid crystal display panel is reduced as well.

BRIEF DESCRIPTION OF PREFERRED EMBODIMENTS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings. Wherein FIG. 1 is a prior art cascade circuit of the one-side GoA driving unit;

DETAILED DESCRIPTION OF PREFERRED EMBODIMENTS

Description of the embodiments will be given along with the accompanied drawings so as to illustrate the present invention can be implemented to particular embodiments. The terms of upper, lower, front, rear, left, right, internal, external, and side are merely referred and based on the orientation of the drawings. Accordingly, the use of those terms are merely for illustration, instead of limitations.

Detailed description will be given to the preferred embodiments of the present invention with accompanied drawings.

Figure 1:
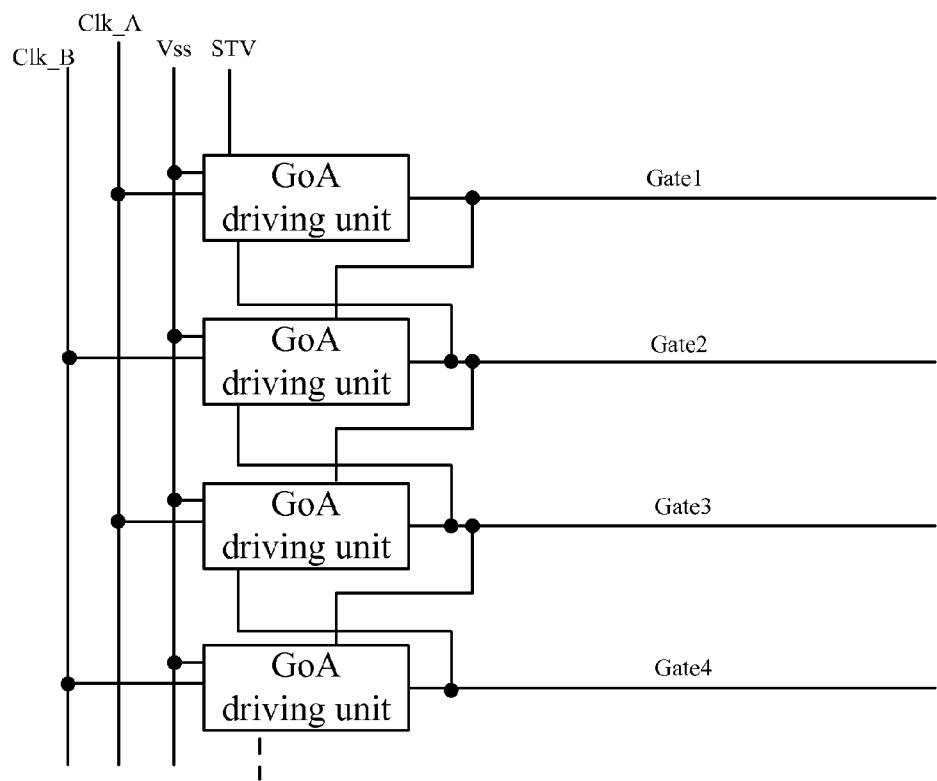
Figure 2:
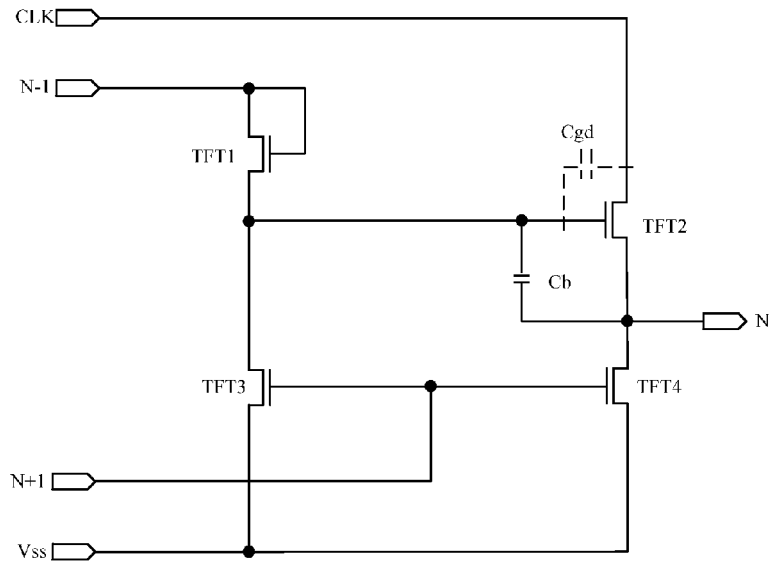
FIG. 2 is a working principle of a driving circuit of a prior art GoA driving unit.
Figure 3:
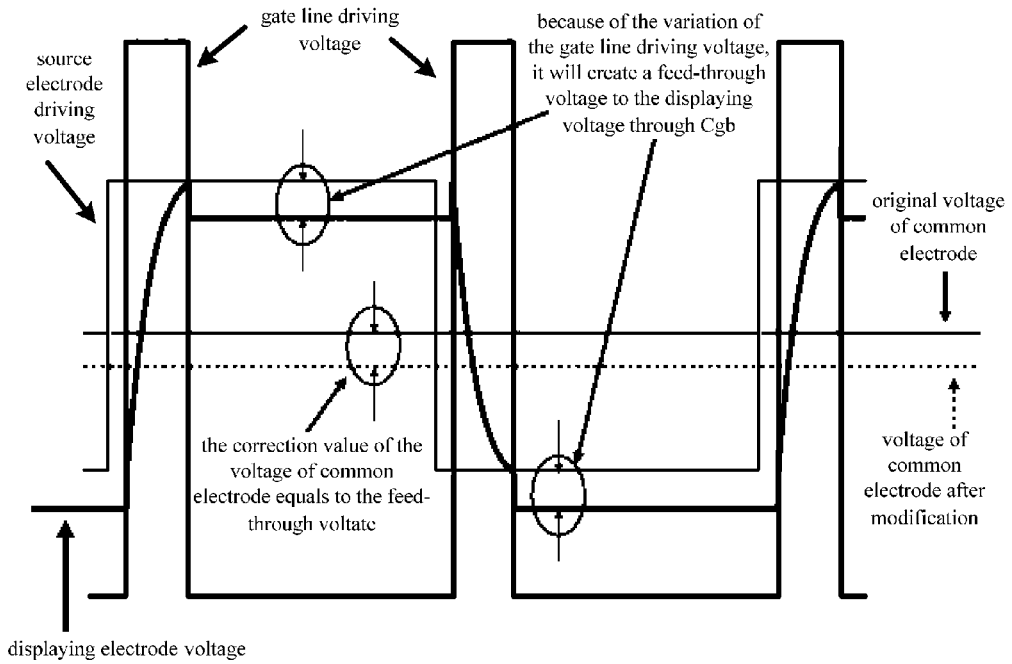
FIG. 3 illustrates voltage waveform in FIG. 1.
Figure 4:
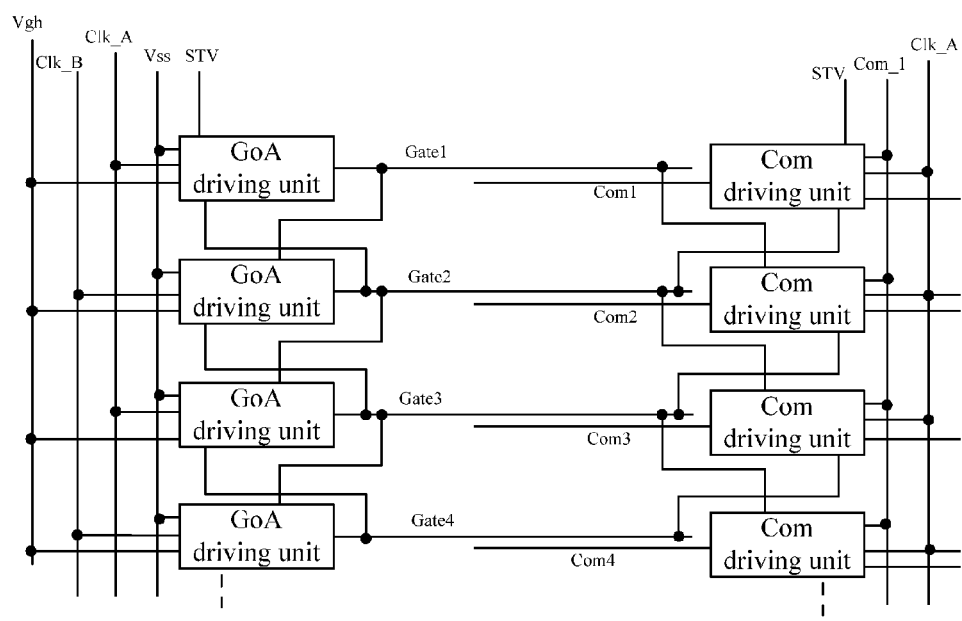
FIG. 4 is a configurational and illustrational view of an array substrate driving circuit made in accordance with the present invention.

As shown in FIG. 4, a configurational and illustrational view of an array substrate driving circuit made in accordance with the present invention is shown. In this embodiment, the array substrate driving circuit includes a plurality of GoA driving units used to drive a plurality of gate lines, and a plurality of Com driving units used to drive a plurality of common electrode lines, wherein each GoA driving unit is interconnected to one gate line, and each Com driving unit is interconnected to one common electrode line.

Wherein the plurality of the GoA driving units are disposed on one side of the array substrate, and the Com driving units are disposed on the other side of the array substrate.

Each of the GoA driving units is associated with a first driving signal input end, a second driving signal input end and a signal output end, wherein the first driving signal input end is interconnected with the signal output end of an upstream GoA driving unit, and the second driving signal input end is interconnected with the signal output end of a downstream GoA driving unit, wherein the gate lines interconnected with the gate lines of the GoA driving units are interconnected to the signal output ends.

Each of the Com driving units is associated with a first driving signal input end, a second driving signal input end and a signal output end, wherein the first driving signal input end of the Com driving unit is interconnected with the signal output end of an upstream GoA driving unit, and the second driving signal input end of the Com driving unit is interconnected with the signal output end of a downstream GoA driving unit, wherein the common electrode lines interconnected to the Com driving units are interconnected to the signal output ends of the Com driving units.

Wherein gate line driving signals on the gate lines and Com driving signals on the adjacent common electrode lines are synchronized from each other but with opposite polarity.

Wherein first driving signal input ends of the GoA driving units and the Com driving units located at the upfront is each interconnected with a scanning triggering signal line (STV) so as to trigger operation of the GoA driving unit and the Com driving unit located at the upfront.

In order for easily facilitating routing of conductive traces or lines, wherein a clock signal output end connected to each of the GoA driving units connected by odd row of the gate lines is referred to a first clock signal output end Clk_A, and wherein a clock signal output end connected to each of the GoA driving units connected by even row of the gate lines is referred to a first clock signal output end Clk_B.

Wherein a clock signal output end connected to each of the Com driving units connected by odd row of the common electrode lines is referred to a first clock signal output end Clk_A, and wherein a clock signal output end connected to each of the Com driving units connected by even row of the common electrode lines is referred to a first clock signal output end Clk_B.

Wherein the first and second clock signals have the same cyclic period, but with half cycle difference in polarity.

When the first clock signal is located to high voltage level, then the second clock signal is located in the low voltage level, and vice versa, when the first clock signal is located in low voltage, then the second clock voltage is at high voltage level.

On the other hand, in the side where the GoA driving unit is located, a low potential input line (Vss) and a high voltage input line (Vgh) are provided and which are interconnected to the GoA driving unit respectively. It can be readily understood that in other embodiment, the low potential input line can be replaced with direct grounding.

On the side where the Com driving units are arranged is provided with a first standard common electrode line Com_A and a second standard common electrode line Com_B which are interconnected to the Com driving unit, respectively.

Figure 5:
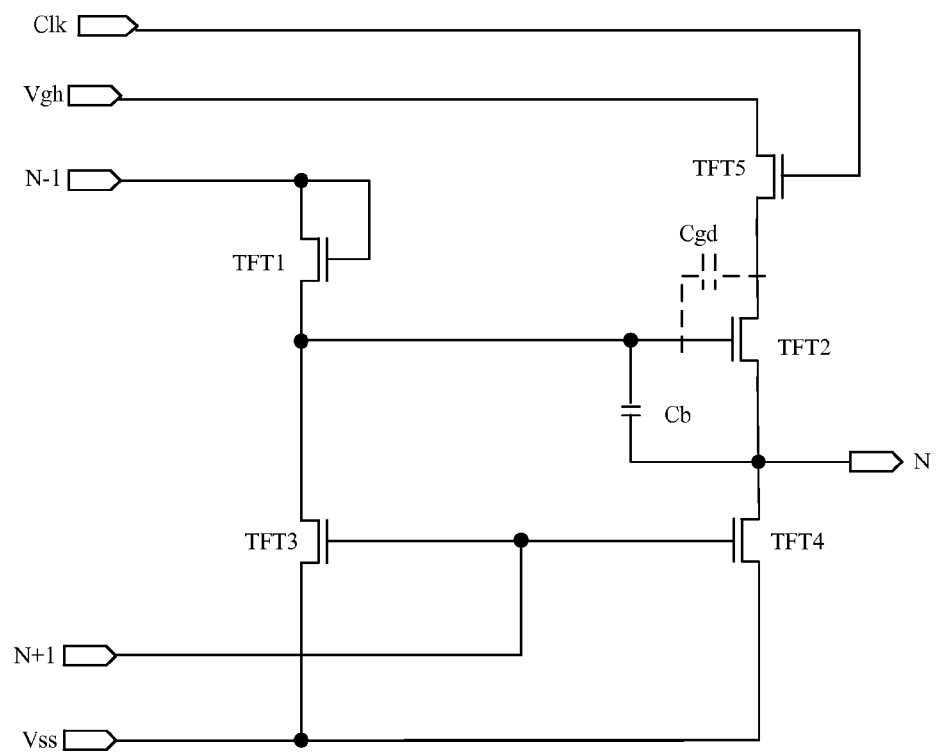
FIG. 5 is an illustration of working principle of GoA driving unit of an embodiment shown in FIG. 4.

As shown in FIG. 5, an illustration of working principle of GoA driving unit of an embodiment shown in FIG. 4 is shown. Please also referring to FIG. 7, a driving timing chart of GoA driving unit is shown. In this embodiment, the GoA driving unit is arranged in a manner of 5T1C, and wherein each of the GoA driving units includes a first thin film transistor TFT 1, a second thin film transistor TFT 2, a third thin film transistor TFT 3, a fourth thin film transistor TFT 4, a fifth thin film transistor TFT 5, and a storage capacitance Cb.

A source electrode and a gate electrode of the first thin film transistor TFT 1 are used to serve as the first driving signal input end, and are interconnected with a signal output end N−1 of a upstream GoA driving unit, a drain electrode of the first thin film transistor TFT 1 is interconnected to a gate electrode of the second thin film transistor TFT 2, the first end of the storage capacitance Cb, and a drain electrode of the third thin film transistor TFT 3, respectively.

A gate of the fifth thin film transistor TFT 5 is interconnected with a clock signal output end Clk, and a source electrode of the fifth thin film transistor TFT 5 is interconnected to a high voltage input line Vgh. In which, if the GoA driving unit is located at odd row, then a gate electrode of the TFT 5 is interconnected to Clk_A; and if the GoA driving unit is located at even row, then the gate electrode of the TFT 5 is interconnected to Clk_B, etc.

A source electrode of the second thin film transistor TFT 2 is interconnected to a drain electrode of the fifth thin film transistor TFT 5, a gate electrode of the second thin film transistor TFT 2 is interconnected to the first end of the storage capacitance Cb, and a drain electrode of and a signal output end N of the second thin film transistor TFT 2 are interconnected together, and further interconnected to a drain electrode of the fourth thin film transistor TFT 4, and the second end of the storage capacitance Cb.

A source electrode of the third thin film transistor TFT 3 is interconnected to the first end of the storage capacitance Cb, and a drain electrode of the third thin film transistor TFT 3 is used as a second driving signal input end, and further interconnected to a signal output end N+1 of a downstream GoA, and a drain electrode of the third thin film transistor TFT 3 is interconnected to a low potential input line (Vss) or ground.

A source electrode and a signal output end N of the fourth thin film transistor TFT 4 are interconnected to the second end of the storage capacitance Cb, a gate electrode of the fourth thin film transistor TFT 4 is interconnected to a signal output end N+1 of a downstream GoA driving unit, and a drain electrode of the fourth thin film transistor is interconnected to a low potential input line (Vss) or ground.

Figure 7:
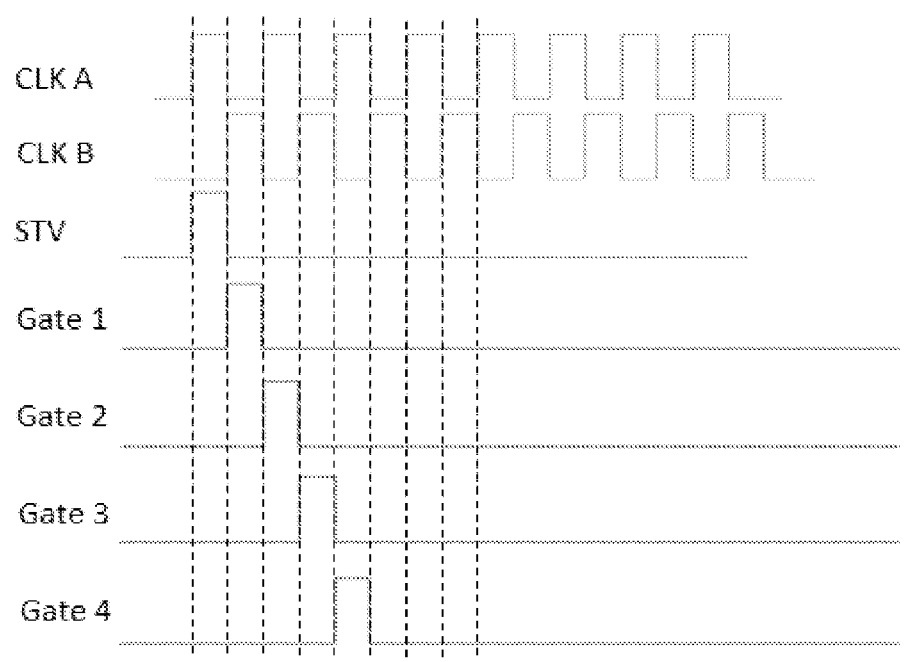
FIG. 7 is a driving timing chart of GoA driving unit shown in FIG. 4.

The working principle of the GoA driving unit will be detailed illustrated in view of FIGS. 5 and 7, which is a timing chart. The working principle is following.

In the N−1 period, i.e. working period of upstream GoA driving unit, the input signal of the signal output end N−1 is at high voltage level, while Clk signal is at low voltage level, Vgh is at high level, and the signal output end N+1 of the downstream GoA is at low voltage level. In this situation, the first thin film transistor TFT 1 and the second thin film transistor TFT 2 are in "normally closed" status, while the third thin film transistor TFT 3, the fourth thin film transistor TFT 4, and the fifth thin film transistor TFT 5 are "normally opened". In this condition, the output signal of the first thin film TFT 1 is at high voltage level, and the storage capacitance Cd starts charging with the driving of the output signal (high voltage level) of the first thin film transistor TFT 1, and the signal output end N of the first thin film transistor TFT 1 is located low voltage level.

While in the N period, i.e. the working period of the GoA driving unit, the signal output end N−1 of the upstream GoA driving unit is at low voltage level, the Clk signal is at high voltage level, the Vgh is at high voltage level, and the signal output end N+1 of the downstream GoA driving unit is at low voltage level. In this condition, the first thin film transistor TFT 1, the third thin film transistor TFT 3, and the fourth thin film transistor TFT 4 are "normally opened", while the second thin film transistor TFT 2 and the fifth thin film transistor TFT 5 are "normally closed", and provides a high voltage level signal at the signal out put end N.

While in the N+1 period, i.e. the working period of the downstream GoA driving unit, the signal output end N−1 of the upstream GoA driving unit is at low voltage level, the Clk signal is at low voltage level, the Vgh is at high voltage level, and the signal output end N+1 of the downstream GoA driving unit is at high voltage level. In this condition, the third thin film transistor TFT 3 and the fourth thin film transistor TFT 4 are "normally closed", while the first thin film transistor TFT 1, the second thin film transistor TFT 2 and the fifth thin film transistor TFT 5 are "normally opened". When the third thin film transistor TFT 3 is "normally closed", the storage capacity Cd is connected to low voltage level or ground and starts to discharge. When the fourth thin film transistor TFT 4 is "normally closed", the signal output end N of the downstream GoA driving unit is connected to low voltage level or ground, and starts to discharge.

By this arrangement, it facilitates the implementation of using the GoA driving units located at one side of the array substrate to drive each of the gate lines of the odd and even rows. As a result, each of the gate lines will be triggered sequentially one after another.

It should be understood that as shown in FIG. 4, totally five TFT transistors and one storage capacitance (i.e. 5T1C) are disclosed and explained with the working principle of its driving circuit. On other preferred embodiment, the number of the TFT transistor can be readily replaced with other suitable number, for example, a driving circuit configured with four TFT transistors.

Figure 6:
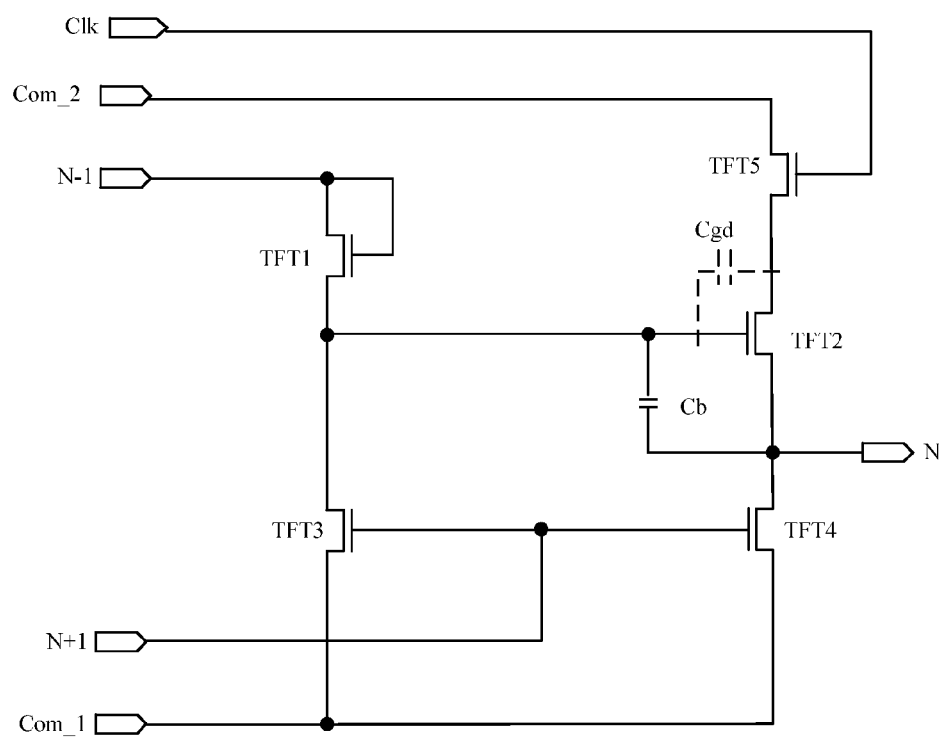
FIG. 6 is an illustration of working principle of Com driving unit of an embodiment shown in FIG. 4.

As shown in FIG. 6, an illustration of working principle of Com driving unit of an embodiment shown in FIG. 4. Please also referred to FIG. 8, which is timing chart. In this current embodiment, the Com driving units are still arranged in 5T1C. Wherein each of the Com driving units includes a first thin film transistor TFT 1, a second thin film transistor TFT 2, a third thin film transistor TFT 3, a fourth thin film transistor TFT 4, a fifth thin film transistor TFT 5, and a storage capacitance CB, wherein:

A source electrode and a gate electrode of the first thin film transistor TFT 1 are served as a first driving signal input end and are interconnected with a signal output end N−1 of a upstream GoA driving unit, a drain electrode of the first thin film transistor TFT 1 is interconnected to a gate electrode of the second thin film transistor TFT 2, the first end of the storage capacitance Cb, and a drain electrode of the third thin film transistor TFT 3, respectively.

A gate of the fifth thin film transistor TFT 5 is interconnected with an output end Clk of a clock, and a source electrode of the fifth thin film transistor TFT 5 is interconnected to a first standard common electrode signal input line Com_A. Wherein, if the GoA driving unit is at odd row, then a gate electrode of the TFT 5 is interconnected to Clk_A; and if the GoA driving unit is located at even row, then the gate electrode of the TFT 5 is interconnected to Clk_B, etc.

A source electrode of the second thin film transistor TFT 2 is interconnected to a drain electrode of the fifth thin film transistor TFT 5, a gate electrode of the second thin film transistor TFT 2 is interconnected to the first end of the storage capacitance Cb, and a drain electrode of and a signal output end N of the second thin film transistor TFT 2 are interconnected together, and further interconnected to a drain electrode of the fourth thin film transistor TFT 4, and the second end of the storage capacitance Cb.

A source electrode of the third thin film transistor TFT 3 is interconnected to the first end of the storage capacitance Cb, and a drain electrode of the third thin film transistor TFT 3 is served as a second driving signal input end, and is interconnected to a signal output end N+1 of a downstream GoA, and a drain electrode of the third thin film transistor TFT 3 is interconnected to a signal input line Com_B of a second standard common electrode.

A source electrode and a signal output end N of the fourth thin film transistor TFT 4 are interconnected to the second end of the storage capacitance Cb, a gate electrode of the fourth thin film transistor TFT 4 is interconnected to a signal output end N+1 of a downstream GoA driving unit, and a drain electrode of the fourth thin film transistor TFT 4 is interconnected to a signal input line Com_B of the second standard common electrode.

Figure 8:
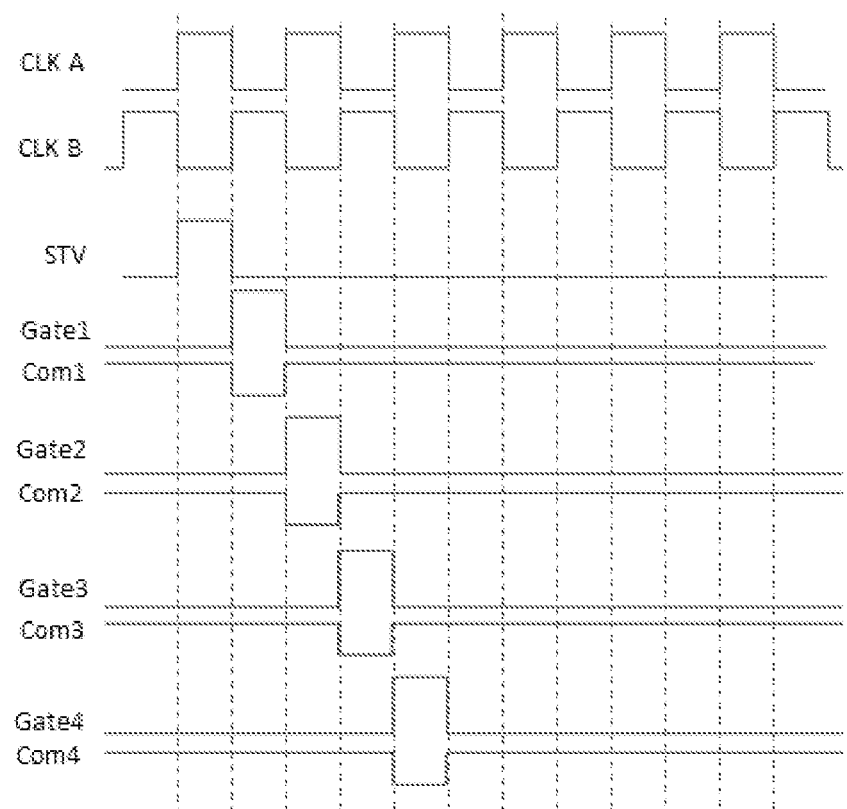
FIG. 8 is timing chart showing relationship between the GoA driving unit and Com driving unit.

From the above description, it can be readily understood that the working principle of the driving circuit of the Com and the driving circuit of GoA are substantially similar. The mere difference is to use high potential input line Vgh and low potential input line Vss to replace the first standard common electrode signal input line Com_A and the second standard common electrode signal input line Com_B. Its working principle is very similar to the GoA driving unit. As a result, by simply selecting or adjusting the input voltage level of the first standard common electrode signal input line Com_A and the second standard common electrode signal input line Com_B, the cycle and timing of the Com driving signal generated by the Com driving unit can be adjusted. As shown in FIG. 8, in the current embodiment of the present invention, the Com driving signal of the Com driving unit is synchronized with the driving signal of an adjacent gate line driving signal (having same cycle), but with reverse or opposite polarity. In addition, the difference the maximum and minimum values of the voltage level of the Com driving signal is smaller than the difference between the maximum and minimum values of the voltage level of the gate line driving signal.

Figure 9:
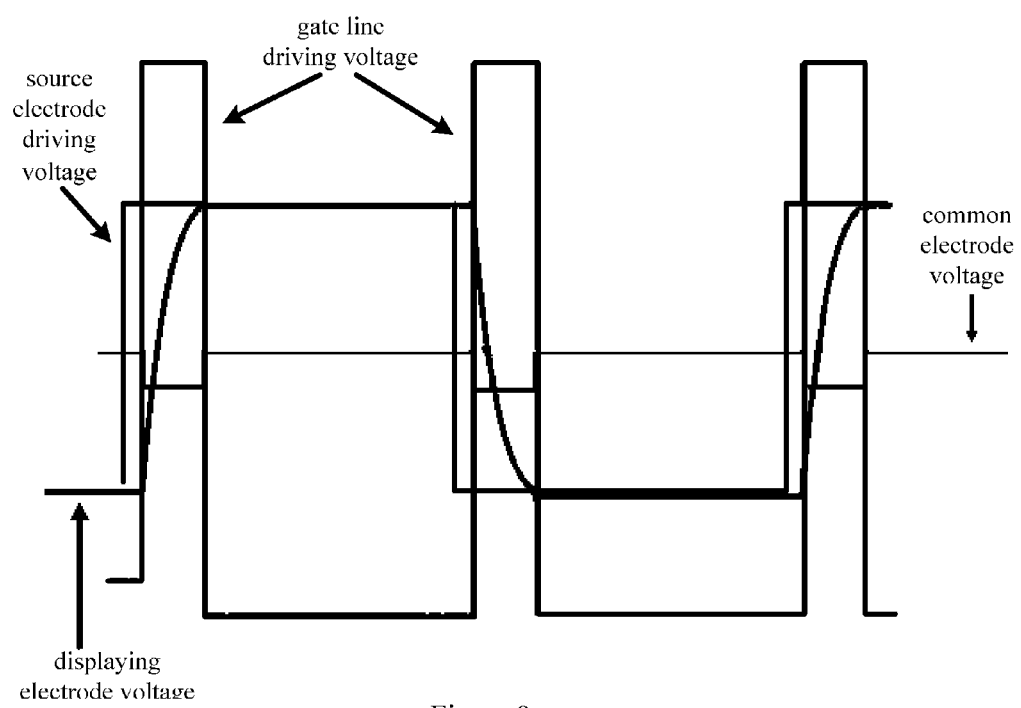
FIG. 9 illustrates voltage waveform of an array substrate driving circuit made in according to another embodiment of the present invention.

FIG. 9 illustrates voltage waveform of an array substrate driving circuit made in according to another embodiment of the present invention. It can be readily appreciated from the disclosure of the drawing in which when the bilateral driving unit GoA driving units and the Com driving units are implemented, the Com driving signal generated by the Com driving unit can be synchronized with the gate line driving signals, but with opposite polarity. As a result, the effect caused by the feed-through voltage can be avoided, and the displaying image can be upgraded.

Correspondingly, the present invention further provides an array substrate for liquid crystal display, includes a plurality of pixels defined by gate lines and data lines, and each of the pixels is configured with thin film transistor and pixel electrode. Wherein the array substrate includes a driving circuit disclosed in FIGS. 4 to 6, and more detailedly, please refer to description in view of FIGS. 4~9. As a result, no detailed description is given herebelow.

Correspondingly, according to another aspect of the present invention, a liquid crystal display is provided and it includes an array substrate; a colorful filter substrate arranged opposite to the array substrate; and a liquid crystal layer arranged between the array substrate and the colorful filter substrate. Wherein the array substrate includes a driving circuit disclosed in FIGS. 4 to 6, and more detailedly, please refer to description in view of FIGS. 4~9. As a result, no detailed description is given herebelow.

The present invention can be concluded with the following advantages when the embodiments are implemented.

In the embodiments made in accordance with the present invention, by using bi-lateral driving units, i.e. the GoA driving unit and Com driving unit, the Com driving signal generated by the Com driving unit can be synchronized with the gate line driving signal. In addition, they polarities are opposite from each other. By this arrangement, the negative pulling effect of the pixel voltage resulted from the gate line driving signal can be readily offset. As a result, the negative effect to the displaying quality caused by the feed-through voltage can be avoided, and the displaying image can be upgraded.

On the other hand, by the asymmetric arrangement of the bilateral GoA driving unit and the Com driving units, this arrangement is really beneficial to make the narrow-boarder display panel, and the manufacturing cost of the liquid crystal display panel is reduced as well.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. An array substrate driving circuit, including a plurality of gate-driver-on-array (GoA) driving units used to drive a plurality of gate lines, and a plurality of Com driving units used to drive a plurality of common electrode lines, wherein each GoA driving unit is interconnected to one gate line, and each Com driving unit is interconnected to one common electrode line;

wherein the plurality of the GoA driving units are disposed on one side of the array substrate, and the Com driving units are disposed on the other side of the array substrate;

each of the GoA driving units is associated with a first GoA driving signal input end, a second GoA driving signal input end and a GoA signal output end, wherein the first GoA driving signal input end is interconnected with the GoA signal output end of an upstream GoA driving unit, and the second GoA driving signal input end is interconnected with the GoA signal output end of a downstream GoA driving unit, wherein the gate lines interconnected with the GoA driving units are interconnected to the GoA signal output ends;

each of the Com driving units is associated with a Com first driving signal input end, a second Com driving signal input end and a Com signal output end, wherein the first Com driving signal input end of the Com driving unit is interconnected with the GoA signal output end of an upstream GoA driving unit, and the second Com driving signal input end of the Com driving unit is interconnected with the GoA signal output end of a downstream GoA driving unit, wherein the common electrode lines interconnected to the Com driving units are interconnected to the Com signal output ends of the Com driving units; and wherein gate line driving signals on the gate lines and Com driving signals on the adjacent common electrode lines are synchronized from each other but with opposite polarity; and wherein each of the GoA driving units includes a first thin film transistor, a second thin film transistor, a third thin film transistor, a fourth thin film transistor, a fifth thin film transistor, and a storage capacitance, wherein source and gate electrodes of the first thin film transistor are interconnected to the GoA signal output end of the upstream GoA driving unit, and a drain electrode of the first thin film transistor is interconnected to a gate electrode of the second thin film transistor, a first end of a storage capacitance, and a drain electrode of the third thin firm transistor, respectively;

a gate electrode of the fifth thin film transistor is interconnected with an output end of a clock, and a source electrode is interconnected to a high voltage input line;

a source electrode of the second thin film transistor is interconnected with a drain electrode of the fifth thin film transistor, a gate electrode of the second thin film transistor is interconnected to the first end of the storage capacitance, a drain electrode and an signal output end of the second thin film transistor are interconnected together, and further interconnected to a source gate of the fourth thin film transistor, and a second end of the storage capacitance;

a source electrode of the third thin film transistor is interconnected to the first end of the storage capacitance, and a gate electrode of the third thin film transistor is interconnected to a GoA signal output end of a downstream GoA driving unit, and a source electrode is interconnected to a low potential line or ground; and a source electrode and a signal output end of the fourth thin film transistor are interconnected to the second end of the storage capacitance, a gate electrode of the fourth thin film transistor is interconnected to the GoA signal output end of a downstream GoA driving unit, and a drain electrode of the fourth thin film transistor is interconnected to a low potential line or ground.

2. The array substrate driving circuit as recited in claim 1, wherein each of the Com driving units includes a first thin film transistor, a second thin film transistor, a third thin film transistor, a fourth thin film transistor, a fifth thin film transistor, and a storage capacitance, wherein a source electrode and a gate electrode of the first thin film transistor are interconnected with a GoA signal output end of an upstream GoA driving unit, a drain electrode of the first thin film transistor is interconnected to a gate electrode of the second thin film transistor, the first end of the storage capacitance, and a drain electrode of the third thin film transistor, respectively;
- a gate of the fifth thin film transistor is interconnected with an output end of a clock, and a source electrode of the fifth thin film transistor is interconnected to a signal input end of a first standard common electrode;
- a source electrode of the second thin film transistor is interconnected to a drain electrode of the fifth thin film transistor, a gate electrode of the second thin film transistor is interconnected to the first end of the storage capacitance, and a drain electrode of and a signal output end of the second thin film transistor are interconnected together, and further interconnected to a drain electrode of the fourth thin film transistor, and the second end of the storage capacitance;
- a source electrode of the third thin film transistor is interconnected to the first end of the storage capacitance, and a drain electrode of the third thin film transistor is interconnected to a GoA signal output end of a downstream GoA, and a drain electrode of the third thin film transistor is interconnected to a signal line of a second standard common electrode; and
- a source electrode and a signal output end of the fourth thin film transistor are interconnected to the second end of the storage capacitance, a gate electrode of the fourth thin film transistor is interconnected to a GoA signal output end of a downstream GoA driving unit, and a drain electrode of the fourth thin film transistor is interconnected to the second standard common electrode.

3. The array substrate driving circuit as recited in claim 2, wherein
- a clock signal output end connected to each of the GoA driving units connected by odd row of the gate lines is referred to a first clock signal output end, and wherein a clock signal output end connected to each of the GoA driving units connected by even row of the gate lines is referred to a second clock signal output end;
- wherein a clock signal output end connected to each of the Com driving units connected by odd row of the common electrode lines is referred to a first clock signal output end, and wherein a clock signal output end connected to each of the Com driving units connected by even row of the common electrode lines is referred to a second clock signal output end; and
- wherein the first and second clock signals have the same cyclic period, but with half cycle difference in polarity.

4. The array substrate driving circuit as recited in claim 3, wherein the first GoA driving signal input end of the GoA driving unit located at the upfront and the first Com driving signal input end of the Com driving unit located at the upfront are each interconnected with a scanning triggering signal line so as to trigger an operation of the GoA driving unit and the Com driving unit located at the upfront.

5. An array substrate for a liquid crystal display, includes a plurality of pixels defined by gate lines and data lines, and each of the pixels is configured with thin film transistor and pixel electrode; further including a plurality of gate-driver-on-array (GoA) driving units used to drive a plurality of gate lines, and a plurality of Com driving units used to drive a plurality of common electrode lines, wherein each GoA driving unit is interconnected to one gate line, and each Com driving unit is interconnected to one common electrode line;

wherein the plurality of the GoA driving units are disposed on one side of the array substrate, and the Com driving units are disposed on the other side of the array substrate;
- each of the GoA driving units is associated with a first GoA driving signal input end, a second GoA driving signal input end and a GoA signal output end, wherein the first GoA driving signal input end is interconnected with the GoA signal output end of an upstream GoA driving unit, and the second GoA driving signal input end is interconnected with the GoA signal output end of a downstream GoA driving unit, wherein the gate lines interconnected with the GoA driving units are interconnected to the GoA signal output ends;
- each of the Com driving units is associated with a Com first driving signal input end, a second Com driving signal input end and a Com signal output end, wherein the first Com driving signal input end of the Com driving unit is interconnected with the GoA signal output end of an upstream GoA driving unit, and the second Com driving signal input end of the Com driving unit is interconnected with the GoA signal output end of a downstream GoA driving unit, wherein the common electrode lines interconnected to the Com driving units are interconnected to the Com signal output ends of the Com driving units; and
- wherein gate line driving signals on the gate lines and Com driving signals on the adjacent common electrode lines are synchronized from each other but with opposite polarity; and
- wherein each of the GoA driving units includes a first thin film transistor, a second thin film transistor, a third thin film transistor, a fourth thin film transistor, a fifth thin film transistor, and a storage capacitance, wherein
- source and gate electrodes of the first thin film transistor are interconnected to the GoA signal output end of the upstream GoA driving unit, and a drain electrode of the first thin film transistor is interconnected to a gate electrode of the second thin film transistor, a first end of a storage capacitance, and a drain electrode of the third thin firm transistor, respectively;
- a gate electrode of the fifth thin film transistor is interconnected with an output end of a clock, and a source electrode is interconnected to a high voltage input line;
- a source electrode of the second thin film transistor is interconnected with a drain electrode of the fifth thin film transistor, a gate electrode of the second thin film transistor is interconnected to the first end of the storage capacitance, a drain electrode and an signal output end of the second thin film transistor are interconnected together, and further interconnected to a source gate of the fourth thin film transistor, and a second end of the storage capacitance;
- a source electrode of the third thin film transistor is interconnected to the first end of the storage capacitance, and a gate electrode of the third thin film transistor is interconnected to a GoA signal output end of a downstream GoA driving unit, and a source electrode is interconnected to a low potential line or ground; and
- a source electrode and a signal output end of the fourth thin film transistor are interconnected to the second end of the storage capacitance, a gate electrode of the fourth thin film transistor is interconnected to the GoA signal output end of a downstream GoA driving unit, and a drain electrode of the fourth thin film transistor is interconnected to a low potential line or ground.

6. The array substrate for the liquid crystal display as recited in claim 5, wherein each of the Com driving units includes a first thin film transistor, a second thin film transistor, a third thin film transistor, a fourth thin film transistor, a fifth thin film transistor, and a storage capacitance, wherein
- a source electrode and a gate electrode of the first thin film transistor are interconnected with a GoA signal output end of an upstream GoA driving unit, a drain electrode of the first thin film transistor is interconnected to a gate electrode of the second thin film transistor, the first end of the storage capacitance, and a drain electrode of the third thin film transistor, respectively;
- a gate of the fifth thin film transistor is interconnected with an output end of a clock, and a source electrode of the fifth thin film transistor is interconnected to a signal input end of a first standard common electrode;
- a source electrode of the second thin film transistor is interconnected to a drain electrode of the fifth thin film transistor, a gate electrode of the second thin film transistor is interconnected to the first end of the storage capacitance, and a drain electrode of and a signal output end of the second thin film transistor are interconnected together, and further interconnected to a drain electrode of the fourth thin film transistor, and the second end of the storage capacitance;
- a source electrode of the third thin film transistor is interconnected to the first end of the storage capacitance, and a drain electrode of the third thin film transistor is interconnected to a GoA signal output end of a downstream GoA, and a drain electrode of the third thin film transistor is interconnected to a signal line of a second standard common electrode; and
- a source electrode and a signal output end of the fourth thin film transistor are interconnected to the second end of the storage capacitance, a gate electrode of the fourth thin film transistor is interconnected to a GoA signal output end of a downstream GoA driving unit, and a drain electrode of the fourth thin film transistor is interconnected to the second standard common electrode.

7. The array substrate for the liquid crystal display as recited in claim 6, wherein
- a clock signal output end connected to each of the GoA driving units connected by odd row of the gate lines is referred to a first clock signal output end, and wherein a clock signal output end connected to each of the GoA driving units connected by even row of the gate lines is referred to a second clock signal output end;
- wherein a clock signal output end connected to each of the Com driving units connected by odd row of the common electrode lines is referred to a first clock signal output end, and wherein a clock signal output end connected to each of the Com driving units connected by even row of the common electrode lines is referred to a second clock signal output end; and
- wherein the first and second clock signals have the same cyclic period, but with half cycle difference in polarity.

8. The array substrate for the liquid crystal display as recited in claim 7, wherein the first GoA driving signal input end of the GoA driving unit located at the upfront and the first Com driving signal input end of the Com driving unit located at the upfront are each interconnected with a scanning triggering signal line so as to trigger an operation of the GoA driving unit and the Com driving unit located at the upfront.

9. A liquid crystal display, including:
an array substrate; a color filter substrate arranged opposite to the array substrate; and
a liquid crystal layer arranged between the array substrate and the colorful filter substrate;
wherein the array substrate includes a plurality of pixels defined by gate lines and data lines, and each of the pixels is configured with thin film transistor and pixel electrode; further including a plurality of gate-driver-on-array (GoA) driving units used to drive a plurality of gate lines, and a plurality of Com driving units used to drive a plurality of common electrode lines, wherein each GoA driving unit is interconnected to one gate line, and each Com driving unit is interconnected to one common electrode line;
wherein the plurality of the GoA driving units are disposed on one side of the array substrate, and the Com driving units are disposed on the other side of the array substrate;
each of the GoA driving units is associated with a first GoA driving signal input end, a second GoA driving signal input end and a GoA signal output end, wherein the first GoA driving signal input end is interconnected with the GoA signal output end of an upstream GoA driving unit, and the second GoA driving signal input end is interconnected with the GoA signal output end of a downstream GoA driving unit, wherein the gate lines interconnected with the GoA driving units are interconnected to the GoA signal output ends;
each of the Com driving units is associated with a Com first driving signal input end, a second Com driving signal input end and a Com signal output end, wherein the first Com driving signal input end of the Com driving unit is interconnected with the GoA signal output end of an upstream GoA driving unit, and the second Com driving signal input end of the Com driving unit is interconnected with the GoA signal output end of a downstream GoA driving unit, wherein the common electrode lines interconnected to the Com driving units are interconnected to the Com signal output ends of the Com driving units; and
wherein gate line driving signals on the gate lines and Com driving signals on the adjacent common electrode lines are synchronized from each other but with opposite polarity; and
wherein each of the GoA driving units includes a first thin film transistor, a second thin film transistor, a third thin film transistor, a fourth thin film transistor, a fifth thin film transistor, and a storage capacitance, wherein
source and gate electrodes of the first thin film transistor are interconnected to the GoA signal output end of the upstream GoA driving unit, and a drain electrode of the first thin film transistor is interconnected to a gate electrode of the second thin film transistor, a first end of a storage capacitance, and a drain electrode of the third thin firm transistor, respectively;
a gate electrode of the fifth thin film transistor is interconnected with an output end of a clock, and a source electrode is interconnected to a high voltage input line;
a source electrode of the second thin film transistor is interconnected with a drain electrode of the fifth thin film transistor, a gate electrode of the second thin film transistor is interconnected to the first end of the storage capacitance, a drain electrode and an signal output end of the second thin film transistor are interconnected together, and further interconnected to a source gate of the fourth thin film transistor, and a second end of the storage capacitance;

a source electrode of the third thin film transistor is interconnected to the first end of the storage capacitance, and a gate electrode of the third thin film transistor is interconnected to a GoA signal output end of a downstream GoA driving unit, and a source electrode is interconnected to a low potential line or ground; and a source electrode and a signal output end of the fourth thin film transistor are interconnected to the second end of the storage capacitance, a gate electrode of the fourth thin film transistor is interconnected to the GoA signal output end of a downstream GoA driving unit, and a drain electrode of the fourth thin film transistor is interconnected to a low potential line or ground.

10. The liquid crystal display as recited in claim 9, wherein each of the Com driving units includes a first thin film transistor, a second thin film transistor, a third thin film transistor, a fourth thin film transistor, a fifth thin film transistor, and a storage capacitance, wherein a source electrode and a gate electrode of the first thin film transistor are interconnected with a GoA signal output end of an upstream GoA driving unit, a drain electrode of the first thin film transistor is interconnected to a gate electrode of the second thin film transistor, the first end of the storage capacitance, and a drain electrode of the third thin film transistor, respectively;

a gate of the fifth thin film transistor is interconnected with an output end of a clock, and a source electrode of the fifth thin film transistor is interconnected to a signal input end of a first standard common electrode;

a source electrode of the second thin film transistor is interconnected to a drain electrode of the fifth thin film transistor, a gate electrode of the second thin film transistor is interconnected to the first end of the storage capacitance, and a drain electrode of and a signal output end of the second thin film transistor are interconnected together, and further interconnected to a drain electrode of the fourth thin film transistor, and the second end of the storage capacitance;

a source electrode of the third thin film transistor is interconnected to the first end of the storage capacitance, and a drain electrode of the third thin film transistor is interconnected to a GoA signal output end of a downstream GoA, and a drain electrode of the third thin film transistor is interconnected to a signal line of a second standard common electrode; and a source electrode and a signal output end of the fourth thin film transistor are interconnected to the second end of the storage capacitance, a gate electrode of the fourth thin film transistor is interconnected to a GoA signal output end of a downstream GoA driving unit, and a drain electrode of the fourth thin film transistor is interconnected to the second standard common electrode.

11. The liquid crystal display as recited in claim 10, wherein a clock signal output end connected to each of the GoA driving units connected by odd row of the gate lines is referred to a first clock signal output end, and wherein a clock signal output end connected to each of the GoA driving units connected by even row of the gate lines is referred to a second clock signal output end;

wherein a clock signal output end connected to each of the Com driving units connected by odd row of the common electrode lines is referred to a first clock signal output end, and wherein a clock signal output end connected to each of the Com driving units connected by even row of the common electrode lines is referred to a second clock signal output end; and wherein the first and second clock signals have the same cyclic period, but with half cycle difference in polarity.

12. The liquid crystal display as recited in claim 11, wherein the first GoA driving signal input end of the GoA driving unit located at the upfront and the first Com driving signal input end of the Com driving unit located at the upfront are each interconnected with a scanning triggering signal line so as to trigger an operation of the GoA driving unit and the Com driving unit located at the upfront.

* * * * *